US011431690B1

(12) United States Patent
Vasquez et al.

(10) Patent No.: US 11,431,690 B1
(45) Date of Patent: Aug. 30, 2022

(54) PROTECTING DATA WITHIN AN EDGE LOCATION WHILE PROVIDING ACCESS TO ASSOCIATED METADATA

(71) Applicant: Amazon Technologies, Inc., Seattle, WA (US)

(72) Inventors: Jorge Peixoto Vasquez, Mercer Island, WA (US); Matthew Graham Baldwin, Rocklin, CA (US); Daniil Bondarev, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 16/909,935

(22) Filed: Jun. 23, 2020

(51) Int. Cl.
*H04L 9/40* (2022.01)
*H04L 67/01* (2022.01)
*H04L 9/06* (2006.01)
*H04L 9/08* (2006.01)

(52) U.S. Cl.
CPC ........ *H04L 63/0471* (2013.01); *H04L 9/0637* (2013.01); *H04L 9/0866* (2013.01); *H04L 67/42* (2013.01)

(58) Field of Classification Search
CPC ... H04L 63/0471; H04L 9/0866; H04L 67/42; H04L 9/0637
See application file for complete search history.

(56) References Cited

U.S. PATENT DOCUMENTS

| | | | |
|---|---|---|---|
| 7,376,716 B2 * | 5/2008 | Dilley | H04L 67/2842 709/219 |
| 2004/0093419 A1 | 5/2004 | Weihl et al. | |
| 2007/0153782 A1 * | 7/2007 | Fletcher | H04L 61/2567 370/389 |
| 2010/0088505 A1 * | 4/2010 | Coppola | H04L 63/10 713/153 |
| 2012/0226770 A1 * | 9/2012 | Schapira | H04L 67/2804 709/217 |
| 2014/0181186 A1 * | 6/2014 | Stevens | H04L 41/509 709/203 |

(Continued)

OTHER PUBLICATIONS

Pandey, A. and Bamrah, G. "Analyzing the Security Schemes of Various Cloud Storage Services". (Year: 2014).*

*Primary Examiner* — John M MacIlwinen
(74) *Attorney, Agent, or Firm* — Robert C. Kowert; Kowert, Hood, Munyon, Rankin & Goetzel, P.C.

(57) ABSTRACT

An edge location of a content delivery network may protect data that is stored and transmitted within the edge location while providing access to associated metadata. After an origin-facing server obtains a requested object, the server may encrypt the object using a client-specific encryption key. In some cases, the server may also separately encrypt the metadata. The encrypted object and metadata may be sent to an intermediate layer server. The intermediate server may decrypt the metadata (if it is encrypted) and determine, based on the metadata, routing for the object. The object remains encrypted at the intermediate server. In some cases, the metadata may be re-encrypted by the intermediate server. The encrypted object and metadata may be sent to a client-facing server, in accordance with the determined routing. The client-facing server may decrypt the encrypted object and send the encrypted object to the client.

20 Claims, 8 Drawing Sheets

(56) References Cited

U.S. PATENT DOCUMENTS

| | | | |
|---|---|---|---|
| 2014/0195516 A1* | 7/2014 | Balakrishnan | G06F 16/168 |
| | | | 707/722 |
| 2015/0012661 A1* | 1/2015 | Elmore | H04L 65/4084 |
| | | | 709/231 |
| 2017/0293766 A1* | 10/2017 | Schnjakin | G06F 21/335 |
| 2019/0082027 A1* | 3/2019 | Choi | H04L 67/2885 |
| 2020/0076779 A1* | 3/2020 | Noble | H04L 65/601 |
| 2020/0259808 A1* | 8/2020 | Rohel | G06F 16/986 |
| 2021/0152351 A1* | 5/2021 | Anson | H04L 9/0637 |

* cited by examiner

PROTECTING DATA WITHIN AN EDGE LOCATION WHILE PROVIDING ACCESS TO ASSOCIATED METADATA

BACKGROUND

Content delivery networks (CDNs) often use data centers at different geographic locations (referred to herein as "points of presence" (POPs) or "edge locations") to deliver content to clients. In many cases, a CDN may set up edge locations that are physically close to clients in order to provide faster responses for content that is requested by the clients. Communications crossing boundaries of an edge location are often encrypted. For example, a client (e.g., web browser or other application) may receive a requested object over a secure connection according to a transport layer security protocol (TLS). However, it can be quite difficult to protect data that is stored and transported across different servers within boundaries of an edge location (e.g., as requested data propagates from the origin-facing layer to the viewer-facing layer). For example, an intruder that gains access to a server cage could potentially access confidential client data by tapping network cables (or even cables that connect a motherboard to solid state drives (SSDs)). In some cases, data may be accidentally exposed to the wrong client. For example, a defective drive may return data to the wrong storage block, resulting in sending one client's confidential data to another.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement protecting data within an edge location of a CDN while providing access to associated metadata, according to some embodiments. In embodiments, protecting data within an edge location while providing access to associated metadata may improve the protection of data as it is stored and/or transmitted within an edge location while also reducing the amount of time to send data through an edge location (e.g., from an origin-facing layer of a cache to a client-facing layer of the cache and vice versa). As used herein, the term "object" may be used to refer to data (e.g., any type of structured data or unstructured data), and vice versa. In embodiments, an object may be data stored at the CDN or data to be stored at the CDN. In some embodiments, an object may be identified using an identifier assigned to the object and/or an identifier included in the data of the data of the object.

In various embodiments, a server of an origin-facing layer of a cache may obtain an object from an origin server (e.g., in response to a request for the object that was received from a client of the CDN). The server may authenticate and/or encrypt the object using a client encryption key (e.g., using Galois/Counter Mode (GCM) algorithm or another type of authentication-encryption algorithm).

In embodiments, the server may also separately encrypt metadata that is associated with the object (e.g., using a GCM algorithm or other type of authentication-encryption algorithm). As described herein, the encryption or decryption may, in various embodiments, be performed using a GCM algorithm or other type of authentication-encryption algorithm (e.g., allowing a server to perform both authentication and encryption/decryption). In some embodiments, a request or response may include the object as well as some or all of the metadata associated with the object (e.g., included in a header of the request or response).

In some embodiments, metadata associated with a given object may include any type of data that a server may use to identify/determine any number of aspects associated with the object or request/response (e.g., whether the object is being obtained from the CDN in response to a client request or uploaded from a client to the CDN). For example, the metadata may include an identifier of a destination (e.g., network address of a server/device) to route the object to, identifier of the associated client that requested the object for download/upload, identifier of the object, indication of the type of the object, indication of the size of the object, other data used by the server to determine one or more actions to perform in order to process the request/response, etc.). After the object (and in some cases the metadata) is encrypted, the server may send the encrypted object and the metadata to an intermediate server of an intermediate layer (e.g., in accordance with the determined routing, as indicated by the identified destination/network address).

After obtaining the encrypted object and the metadata, if the metadata is encrypted, the intermediate server may decrypt the encrypted metadata. In embodiments, the encrypted object remains encrypted while at the intermediate server. This may prevent unauthorized access of the object, even if someone gains access to the server.

In embodiments, the intermediate server may identify/determine any number of aspects associated with the object or request/response (e.g., based on based on a cookie, identifiers, or other metadata). For example, the intermediate server may determine, based on the metadata, a network address of another server to route the object to. In cases where the obtained metadata was encrypted metadata, the intermediate server may then re-encrypt the decrypted metadata.

The intermediate server may then send the encrypted object and the metadata to another server of a client-facing layer (e.g., in accordance with the determined routing, as indicated by the identified destination/network address). In embodiments, the intermediate server may send the encrypted object and the metadata to any number of intermediate layers (performing the above process at each layer) before finally sending the encrypted object and the metadata to a server of a client-facing layer.

In embodiments, the server of the client-facing layer may decrypt the encrypted object using an encryption key. If the metadata is also encrypted, then the server may separately decrypt the encrypted object and the encrypted metadata. In embodiments, the server may identify/determine any number of aspects associated with the object or request/response (e.g., based on based on a cookie, identifiers, or other metadata). For example, the server may determine, based on the metadata, a network address of the client/device to route the object to.

The server may send the decrypted object to the client (e.g., in accordance with the determined routing, as indicated by the identified destination/network address). As described herein, a similar process may be performed to protect uploaded data within an edge location of a CDN (e.g., an object that is received from a client at the client-facing layer and sent across the edge location (via one or more intermediate servers/layers) to the origin-facing layer for upload to an origin server of the CDN).

In some embodiments, the edge location may be considered a secure unit. Therefore, any communications crossing the boundaries of the edge location (POP boundaries) are encrypted (e.g., sending data to a viewer, origin fetches, command-and-control traffic). In some cases, to protect against data extraction at an edge location, a CDN may use a traditional technique that includes hardware locking on SSDs and use of an ephemeral key which is lost upon reboot. However, this technique may be vulnerable to the threat of a more sophisticated intruder gaining access to the cage, who could potentially tap network cables or even cables connecting the motherboards to the SSDs. Moreover, such a traditional technique may not provide protection against the confused SSD threat, in which defective drives return data from the wrong storage block (potentially sending one client's data to another). Other traditional techniques to protect data at an edge location (e.g., implementing a VPN or using a TLS protocol to send data between layers) may substantially reduce throughput of the data while also consuming additional hardware resources.

In embodiments, data is fetched to the edge location by an origin-facing layer and the data (e.g., object) may be immediately (or within a relatively short period of time) encrypted and/or authenticated it with a client-specific key (using an authentication-encryption algorithm). Request metadata (e.g., metadata for the fetched object) may be encrypted separately, so that intermediate layers of the edge location can access the metadata to properly interpret the received data. When finally sending the data to the end user, the data may be decrypted at the viewer facing layer. Conversely, request data and metadata (e.g., for upload from the client to the CDN) may also be encrypted at the viewer facing layer and the data may be decrypted at the origin facing layer before it is sent to a destination for storage (e.g., to an origin server). Therefore, embodiments may circumvent the need to encrypt bulk data between layers and/or on the storage devices. Instead, embodiments may allow for a mostly fixed per-request cost to encrypt and decrypt the metadata only (without decrypting the associated data/object).

Embodiments may provide the additional advantage of limiting cleartext data exposure to a minimum set of components (e.g., only the components that need it the cleartext, such as a client-facing server or an origin-facing server). Embodiments may improve efficiency compared to traditional techniques. A cached object may be encrypted once, and on the hot from-caching serving path, the cached object may be decrypted once before sending it to a viewer (e.g., client). This technique avoids the need to re-encrypt the data between layers at the edge location. Moreover, this may allow the use of optimal block sizes, without limitations of using relatively small packet sizes that may affect the performance of certain types of security-related software. In some embodiments, the above technique allows an intermediate cache layer to stream encrypted data from its cache directly to the network using mechanisms such as the sendfile. Embodiments described herein protect privacy and ensure integrity of content served and stored in a CDN. For example, intermediary servers and/or links used for storing and delivering content may be insecure while overall security and integrity of the content may be maintained.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for protecting data within an edge location while providing access to associated metadata. A number of different methods and techniques to implement protection of data within an edge location while providing access to associated metadata are discussed, some of which are illustrated in accompanying flowcharts. Finally, a description of an example computing system upon which the various components, modules, systems, and/or techniques described herein may be implemented is provided. Various examples are provided throughout the specification.

Figure 1:
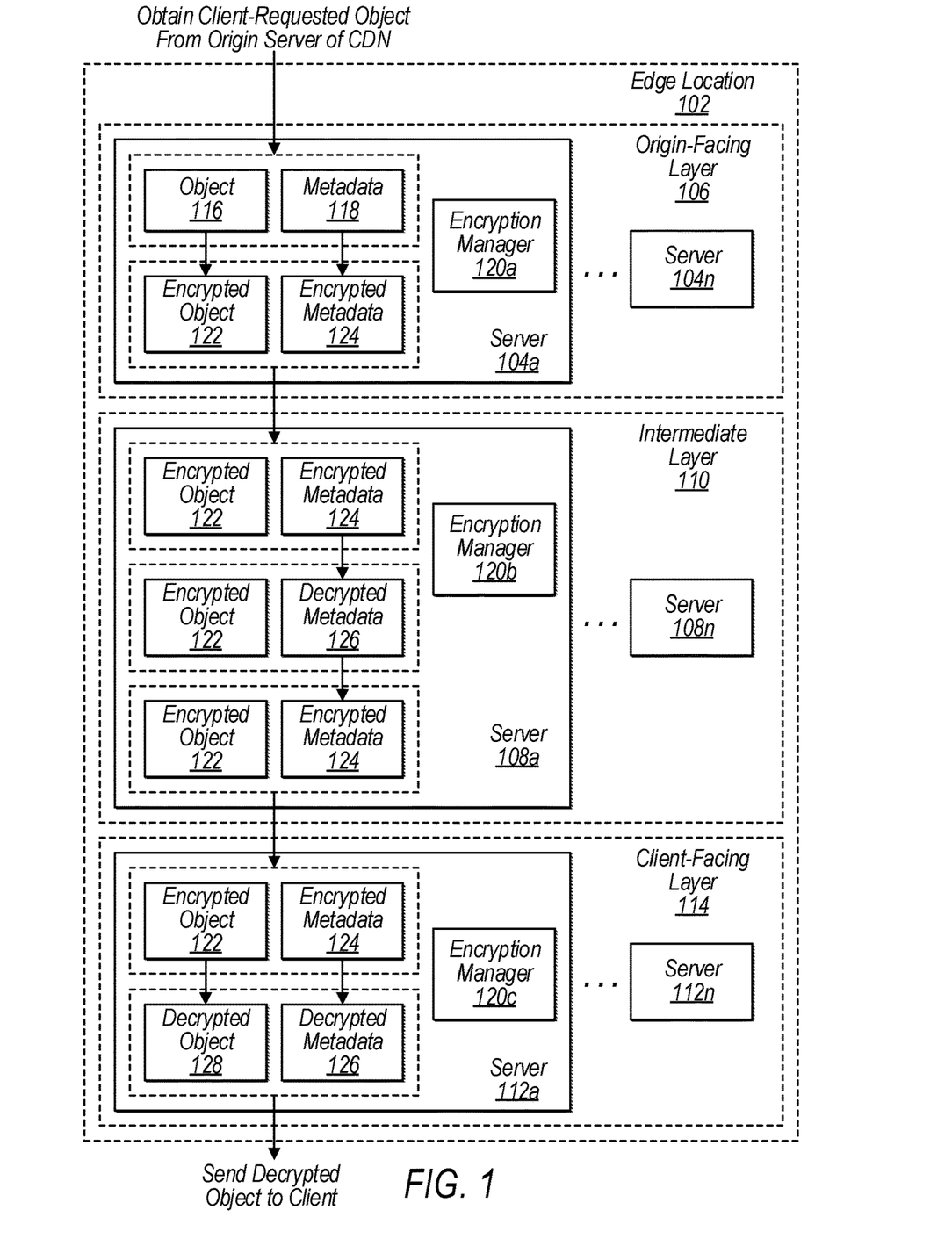
FIG. 1 is a logical block diagram illustrating a system for protecting data within an edge location while providing access to associated metadata, according to some embodiments.

FIG. 1 is a logical block diagram illustrating a system for protecting data within an edge location while providing access to associated metadata, according to some embodiments.

As shown, an edge location 102 of a CDN includes one or more servers 104 of an origin-facing layer 106, one or more servers 108 of an intermediate layer 110, and one or more servers 112 of a client-facing layer 114 (e.g., different layers of a cache that store objects and provide objects to one or more clients of the CDN). In some embodiments, an edge location may include any number of intermediate layers (e.g., zero or more intermediate layers) that each include one or more servers. For example, if there is no intermediate layer, then the origin-facing layer/server may send the encrypted object and encrypted metadata directly to the client-facing layer/server (note that the encrypted object may still be protected from a potential intruder on any number of network devices/cables/routers as it is transmitted in between the origin-facing layer/server and the client-facing layer/server. As discussed below, in some embodiments, the same layer/server may operate as both the origin-facing layer and the client-facing layer.

In embodiments, the edge location 102 may be a data center of the CDN (e.g., a POP). In some embodiments, one or more remote origin servers of the CDN (e.g., at a data center) may provide objects for storage at one or more layers of the edge location/cache (e.g., in response to a client request for the object and/or a cache miss). In embodiments, any number of encrypted objects may be stored in any of the layers as a cached encrypted object at that layer. In response to receiving a request for an object from a client-facing server, the intermediate server may send the encrypted version of the object from the intermediate cache of the server to the client-facing server (where it may be decrypted and sent to the client). In embodiments, any number of different clients of the CDN may request and obtain the same object is this manner.

In embodiments, a given cache layer (e.g., an intermediate layer) may cache most recently used objects. For example, an intermediate layer may store the 100 objects that were most recently requested from one or more clients (as cached encrypted objects). In embodiments, one or more of the cached encrypted objects (e.g., least recently requested objects) may be evicted to make room for more recently requested objects. In some embodiments, one or more encrypted objects may be stored as encrypted cached objects for a certain length of time (or indefinitely), regardless of how recent the objects were requested.

In the depicted embodiment, a server of the origin-facing layer (e.g., server 104*a*) may obtain an object 116 from an origin server of the CDN. In embodiments, the server 104*a* may request and/or obtain the object in response to a request that was received from a client at the edge location that resulted in a cache miss. The client that sends the request may be a web browser or other application of a remote device and/or remote client network and the requested object may include any type of object/data (e.g., image data and/or non-image data such as text, etc.). If the object is not stored at the cache of the edge location (e.g., not cached at any of the layers 106, 110, 114), then the object may be obtained/received at a server 104 from a remote origin server of the CDN. For example, the server 104*a* (or any other server of the edge location) may forward the request for the object to the origin server. In embodiments, the forwarded request may include metadata (e.g., metadata 118) associated with the request and/or object.

In various embodiments, a given client request for an object may be received at the client-facing layer and the request may cascade through any number of intermediate layers until it arrives at the origin-facing layer. The request is then sent to an origin server and a response to the request (the response may include the requested object) may be obtained by the origin-facing layer. The response may then be cascaded back through the intermediate layers (e.g., obtained or fetched by a corresponding server at each layer) until it is obtained (fetched) by the client-facing layer. The response may then be sent to the client. In embodiments, to "obtain" a response/object may include fetching and/or receiving the response/object by a server/layer of an edge location.

As shown, the object 116 and/or the associated metadata 118 are obtained (e.g., received, fetched, etc. in response to the request from the client for the object) by the server 104*a*. In some embodiments, a response (e.g., with header data that includes at least some of the metadata) may include the object 116 and the metadata 118. In some embodiments, at least a portion of the metadata 118 from the original request for the object may have been stored at the server 104*a*, in which case at least some of the metadata associated with the fetched object may also be obtained from the server 104*a* itself.

In the depicted embodiment, an encryption manager 120 of the origin-facing server 104*a* (e.g., an application/process running on the server 104*a*) may encrypt the object using an encryption key, generating the encrypted object 122. The encryption key may be a client-specific key (e.g., a client master key) or derived from a client-specific key that is assigned to the client that requested the object. Therefore, the encryption key may be unique with respect to other encryption keys that are used to encrypt objects requested by other clients. In embodiments, the server 104*a* may determine, based on the metadata, routing for the object (e.g., a destination server).

In the example embodiment, the encryption manager 120 also separately encrypts the metadata (or at least a portion of the metadata) to generate encrypted metadata 124 (e.g., using a different encryption key). The encryption of the object and the encryption of the metadata may occur at the same time (concurrently) or at approximately the same time. In various embodiments, the encryption manager 120 may encrypt the metadata using another encryption key that is different than the encryption key used to encrypt the object (in some embodiments, the same key may be used). In embodiments, the other encryption key used to encrypt/decrypt the metadata may also be a client-specific key (e.g., a client master key) or derived from a client-specific key that is assigned to the client that requested the object. As shown, the server 104*a* may then send the encrypted object and the encrypted metadata to an intermediate server (e.g., server 108*a*) of an intermediate layer.

In some embodiments, the object and a portion of the metadata are encrypted together using the same encryption key and another portion of the metadata remains unencrypted. This may be useful to efficiently transport and protect metadata that does not need to be accessed by intermediate servers to determine routing or other aspects for handling the object/response.

After obtaining the encrypted object and the metadata, the encryption manager 120 of the intermediate server 108*a* may decrypt the encrypted metadata (e.g., using the other encryption key) to generate the decrypted metadata 126 (e.g., obtaining the unencrypted version of the metadata 118). In embodiments, the encrypted object 122 remains encrypted while at the intermediate server.

In embodiments, the intermediate server 108*a* may not have access to the encryption key that was used to encrypt the object and/or may not have access to the client-specific key that was used to derive the encryption key that was used to encrypt the object. In embodiments, the origin-facing layer/servers and the client-facing layer/servers may be the only layers/servers that store the encryption key(s) that are used to encrypt/decrypt the object (e.g., those encryption key(s) may be a shared secret between the origin-facing layer/servers and the client-facing layer/servers). As described herein, this may prevent unauthorized access of the object, even if someone gains access to the intermediate servers. However, in order to decrypt the metadata, the intermediate servers may require access to the encryption key that was used to encrypt the metadata. For example, the key for encrypting/decrypting the metadata may be stored on the intermediate server(s) (e.g., as a shared secret between the intermediate server(s) and the origin-facing server(s) and/or client-facing server(s)).

In various embodiments, the intermediate server may identify/determine any number of aspects associated with the object or request/response (e.g., based on based on a cookie, identifiers, or other metadata). For example, the intermediate server may determine, based on the metadata, routing for the object (e.g., a network address of another server to route the object to). The encryption manager 120 may then re-encrypt (e.g., using the other encryption key) the decrypted metadata 126 to generate the encrypted metadata 124. The intermediate server may then send the encrypted object and the encrypted metadata to another server (e.g., server 112a) of a client-facing layer (e.g., in accordance with the determined routing, as indicated by the identified destination/network address of the metadata). In embodiments, the intermediate server may send the encrypted object and the metadata to another intermediate server/layer any number of times (performing the above process at each intermediate layer) before finally sending the encrypted object and the encrypted metadata to a server of a client-facing layer.

In embodiments, the encryption manager 120 of the server 112a of the client-facing layer may decrypt the encrypted object 122, using the encryption key that was previously used for encrypting the object, to generate the decrypted object 128. In embodiments, the encryption manager 120 separately decrypts the encrypted metadata, generating the decrypted metadata 126. As described above, the server may identify/determine any number of aspects associated with the object or request/response (e.g., based on based on a cookie, identifiers, or other metadata). For example, the server may determine, based on the metadata, a network address of the client/device to route the object to. The server may send the decrypted object 128 to the client (e.g., in accordance with the determined routing, as indicated by the identified destination/network address).

In various embodiments, an encryption key may be derived (by a server/encryption manager) from a master client key and one or more other identifiers/data. For example, an encryption key may be derived (e.g., generated) using one or more of a master encryption key assigned to the client, an identifier for the client, an identifier for the object, and an identifier associated with the request to obtain the object or upload the object (e.g., an identifier assigned to the request that was submitted by the client to the CDN).

In some embodiments, an encrypted object may be cached at an intermediate server/layer and retrieved in response to a cache hit. In response to receiving, from a client-facing server, a request for the object, the intermediate server may send the encrypted object to the client-facing server, where it can be decrypted and send to the client (e.g., as described above). Note that in some embodiments, at least a portion of the associated metadata may be encrypted with the object (e.g., metadata that is not needed to be access by servers for routing, etc.). Therefore, the origin-facing server (or client-facing server for uploads) may encrypt some of the metadata with the object and may separately encrypt the remaining metadata (or may not encrypt the remaining metadata at all in some embodiments).

In some embodiments, a client-facing server may receive another client's data (e.g., another client's encrypted object belonging to another client) in response to a request a client for a particular object (e.g., due to a confused SSD). For example, the other client's encrypted object may be stored in another location of a cache as a result of previous request from the other client for the other object. When the client-facing server receives the other client's encrypted object, the client-facing server (e.g., the key manager) may determine, based on an encryption key assigned to the client, that the other client's encrypted object is not authenticated (e.g., using an authentication-encryption algorithm). For example, the authentication-encryption algorithm may determine that using the encryption key assigned to the client results in an authentication failure because the other client's encrypted object was encrypted with a different encryption key used by the other client.

Figure 5:
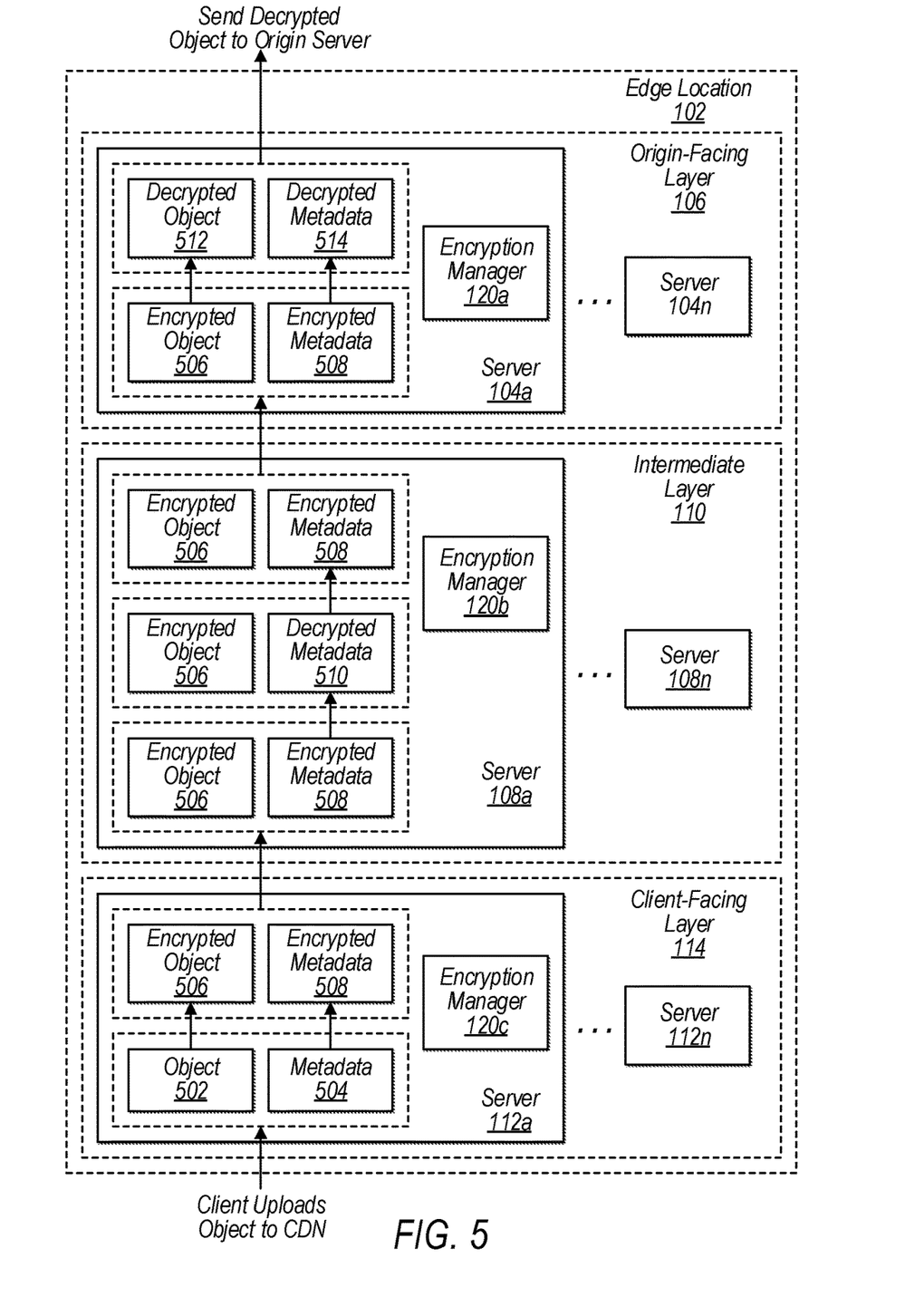
FIG. 5 is a logical block diagram illustrating a system for protecting uploaded data within an edge location while providing access to associated metadata, according to some embodiments.

As described in FIG. 5, a same/similar process may be performed to protect uploaded data within an edge location of a CDN (e.g., an object that is received from a client at the client-facing layer and sent across the edge location (via one or more intermediate servers/layers) to the origin-facing layer for upload to an origin server of the CDN). Note that in some embodiments, some or all of the metadata in FIG. 1 or FIG. 5 may remain unencrypted at each layer, since the routing of objects (or other aspects identified by the metadata) may not be considered as confidential or sensitive data.

Figure 2:
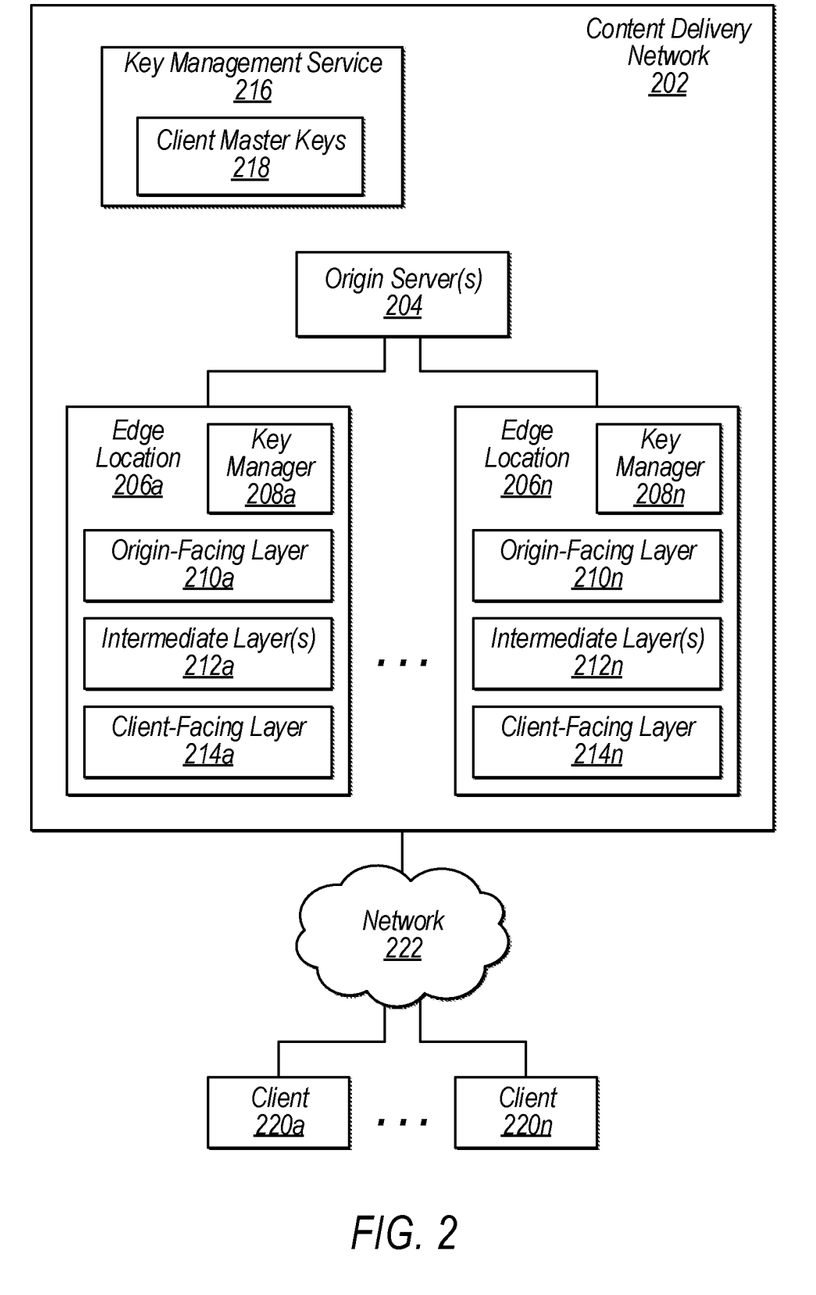
FIG. 2 is a logical block diagram illustrating a content delivery network that includes a key management service and different edge locations that obtain encryption keys from the key management service, according to some embodiments.

FIG. 2 is a logical block diagram illustrating a CDN that includes a key management service and different edge locations that obtain encryption keys from the key management service, according to some embodiments.

In the example embodiment, the CDN 202 includes one or more origin servers 204 in one or more data centers and different remote edge locations 206a-206n (e.g., remote data centers/remote networks with edge servers). Each edge location may include a key manager 208 and a cache with an origin-facing layer 210, any number of intermediate layers 212, and a client-facing layer 214. In embodiments, some or all of the content in each of the layers is based on (e.g., provided by) content stored at the origin server(s) 204.

As shown, the CDN 202 also includes a key management service 216 that manages client master keys 218 for any number of clients 220 of the CDN. The clients 220 may be remote clients that communicate with the CDN 202 via a wide area network 222 (e.g., the Internet). Clients 220 may send requests for content (e.g., objects) over network 222 to any number of respective edge locations. In embodiments, a given client may have its requests routed/sent to a particular edge location (e.g., based on physical proximity or other factors).

In the depicted embodiment, for a given client, the key management service 216 may send one or more client master keys (generated and/or assigned for the client by the key management service) to a key manager 208 of an edge location 206. The key manager 208 may provide the client master keys to the encryption managers of the servers so that the encryption managers may use the client master key(s) and/or derive any necessary keys to perform any of the encryption and decryption described herein (e.g., encrypting and decrypting objects and/or metadata).

Figure 3:
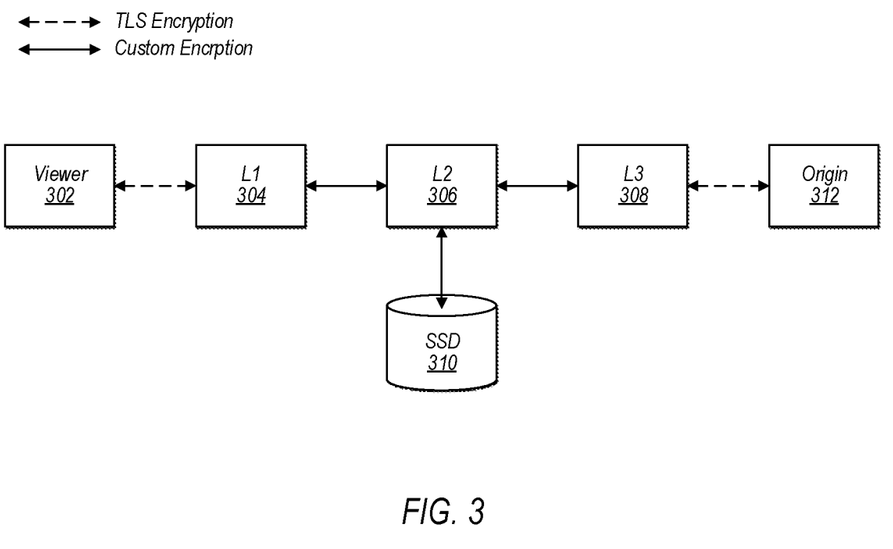
FIG. 3 is a logical block diagram illustrating different types of encryption used in a system for protecting data within an edge location while providing access to associated metadata, according to some embodiments.

FIG. 3 is a logical block diagram illustrating different types of encryption used in a system for protecting data within an edge location while providing access to associated metadata, according to some embodiments.

In the example embodiment, a viewer 302 (e.g., web browser or other application on a computing device or mobile computing device) may receive and send objects from/to an L1 layer 304 (e.g., servers of a viewer-facing layer) using TLS encryption (via a TLS connection). The L1 layer 304 may receive and send objects from/to an L2 layer 306 (e.g., servers of an intermediate layer) using custom encryption. For example, a modified version of the hypertext transport protocol (HTTP) or other network messaging protocol may be implemented in order to encrypt/decrypt some or all of the metadata in requests/responses as they propagate through layers.

As shown, the L2 layer 306, the L3 layer 308 (e.g., servers of the origin-facing layer), and the SSDs 310 (e.g., storing cached objects) may also use the customer encryption to receive and send objects to each other. Finally, the origin 312 (e.g., origin server) may receive and send objects from/to an L3 layer 308 312. By implementing a modified network messaging protocol to use custom encryption, objects may be protected at various layers within the edge location while taking advantage of other functionality provided by the network messaging protocol.

Figure 4:
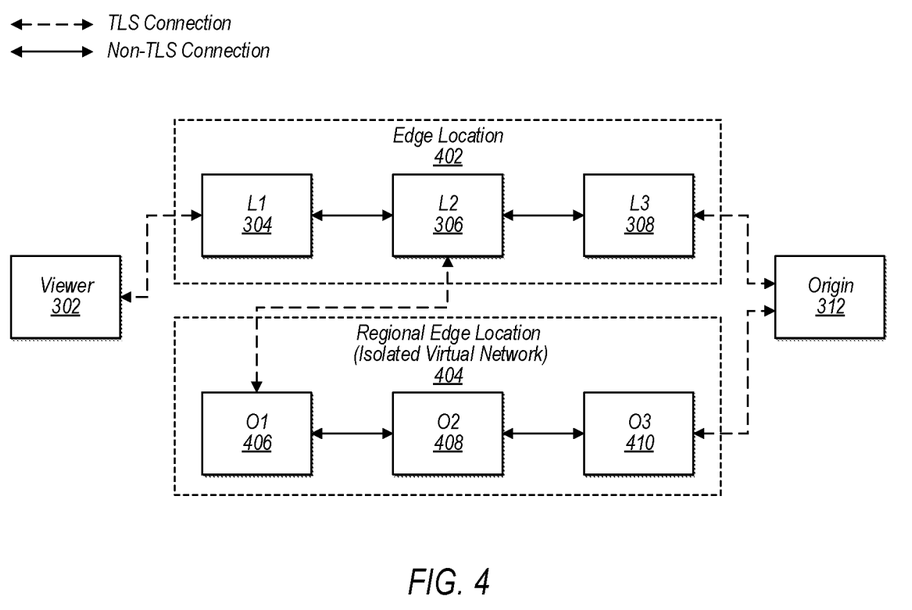
FIG. 4 is a logical block diagram illustrating different types of connections used in a system for protecting data within an edge location while providing access to associated metadata, according to some embodiments.

FIG. 4 is a logical block diagram illustrating different types of connections used in a system for protecting data within an edge location while providing access to associated metadata, according to some embodiments.

In the example embodiment, a CDN may implement two different edge locations. Each edge location may include a group of servers/network within which client data is to be protected. As shown, one edge location 402 includes the L1 layer 304, the L2 layer 306, and the L3 layer 308. Another regional edge location 404 includes an isolated virtual network (e.g., a virtual private network/virtual local network) implemented on one or more servers of the regional edge location 404. In some embodiments, the regional edge location 404 may be located at another data center (e.g., the edge location 402 and the regional edge location 404 may or may not be located within the same data center). In various embodiments, each layer of either edge location may include any number of servers (e.g., physical servers and/or compute instances).

As shown, the regional edge location 404 may implement three different layers (O1 406, O2 408, and O3 410) that respectively perform the same or similar caching/storage functionality and encryption as described herein for the L1 layer 304, the L2 layer 306, and the L3 layer 308. For example, the O3 layer 410 may obtain objects from the origin 312, which may be cached at the O2 layer 408 and the O1 layer 406. In embodiments, the L2 layer 306 may obtain an object from the O1 layer 406 in response to a client request for the object (e.g., in response to a cache miss), instead of obtaining the object from the origin 312. In embodiments, this may allow for faster retrieval of objects than if no regional edge location is used.

In the depicted embodiment, the L2 layer 306 communicates with the O1 layer 406 using one or more TLS connections. The origin 312 communicates with the L3 layer 308 and the O3 layer 410 using one or more TLS connections. As shown, the viewer 302 communicates with the L1 layer 304 using one or more TLS connections.

FIG. 5 is a logical block diagram illustrating a system for protecting uploaded data within an edge location while providing access to associated metadata, according to some embodiments.

In the depicted embodiment, a server of the client-facing layer (e.g., server 112a) may obtain an object 502 and associated metadata 504 from a client for upload/storage at the CDN (e.g., a request from a browser or other application to store the object). The object may include any type of object/data (e.g., image data and/or non-image data such as text, etc.).

In embodiments, a request (e.g., with header data that includes at least some of the metadata) may include the object 116 and the metadata 118. In some embodiments, at least a portion of the metadata 504 may be generated by the server 112a.

In the depicted embodiment, an encryption manager 120 may encrypt the object using an encryption key, generating the encrypted object 506. The encryption key may be a client-specific key (e.g., a client master key) or derived from a client-specific key that is assigned to the client that requested the object. Therefore, the encryption key may be unique with respect to other encryption keys (e.g., other client master keys) that are used to encrypt objects requested by other clients. In embodiments, the server 112a may determine, based on the metadata, routing for the object (e.g., a destination server).

In the example embodiment, the encryption manager 120 also separately encrypts the metadata (or at least a portion of the metadata) to generate encrypted metadata 508. The encryption of the object and the encryption of the metadata may occur at the same time (concurrently) or at approximately the same time. In various embodiments, the encryption manager 120 may encrypt the metadata using another encryption key that is different than the encryption key used to encrypt the object (in some embodiments, the same key may be used). In embodiments, the other encryption key may be also be a client-specific key (e.g., a client master key) or derived from a client-specific key that is assigned to the client that requested the object. As shown, the server 104a may then send the encrypted object and the encrypted metadata to an intermediate server (e.g., server 108a) of an intermediate layer.

After obtaining the encrypted object and the metadata, the encryption manager 120 of the intermediate server 108a may decrypt the encrypted metadata (e.g., using the other encryption key) to generate the decrypted metadata 510 (e.g., obtaining the unencrypted version of the metadata 508). In embodiments, the encrypted object 506 remains encrypted while at the intermediate server. As described herein, this may prevent unauthorized access of the object, even if someone gains access to the server.

In various embodiments, the intermediate server may identify/determine any number of aspects associated with the object or request/response (e.g., based on based on a cookie, identifiers, or other metadata). For example, the intermediate server may determine, based on the metadata, routing for the object (e.g., a network address of another server to route the object to). The encryption manager 120 may then re-encrypt (e.g., using the other encryption key) the decrypted metadata 510 to generate the encrypted metadata 508.

The intermediate server may then send the encrypted object and the encrypted metadata to another server (e.g., server 104a) of an origin-facing layer (e.g., in accordance with the determined routing, as indicated by the identified destination/network address of the metadata). In embodiments, the intermediate server may send the encrypted object and the metadata to another intermediate server/layer any number of times (performing the above process at each intermediate layer) before finally sending the encrypted object and the encrypted metadata to a server of an origin-facing layer.

In embodiments, the encryption manager 120 of the server 104a of the origin-facing layer may decrypt the encrypted object 506, using the encryption key that was previously used for encrypting the object, to generate the decrypted object 512. In embodiments, the encryption manager 120 separately decrypts the encrypted metadata, generating the decrypted metadata 514. As described above, the server may identify/determine any number of aspects associated with the object or request/response (e.g., based on based on a cookie, identifiers, or other metadata). For example, the server may determine, based on the metadata, a network address of the client/device to route the object to.

The server may send the decrypted object 512 to an origin server or other destination of the CDN for storage (e.g., in accordance with the determined routing, as indicated by the identified destination/network address). Note that in some embodiments, some or all of the metadata in FIG. 1 or FIG. 5 may remain unencrypted at each layer, since the routing of objects (or other aspects identified by the metadata) may not be considered as confidential or sensitive data. Therefore, in embodiments, the metadata is not encrypted and therefore no decryption of metadata is necessary.

Figure 6:
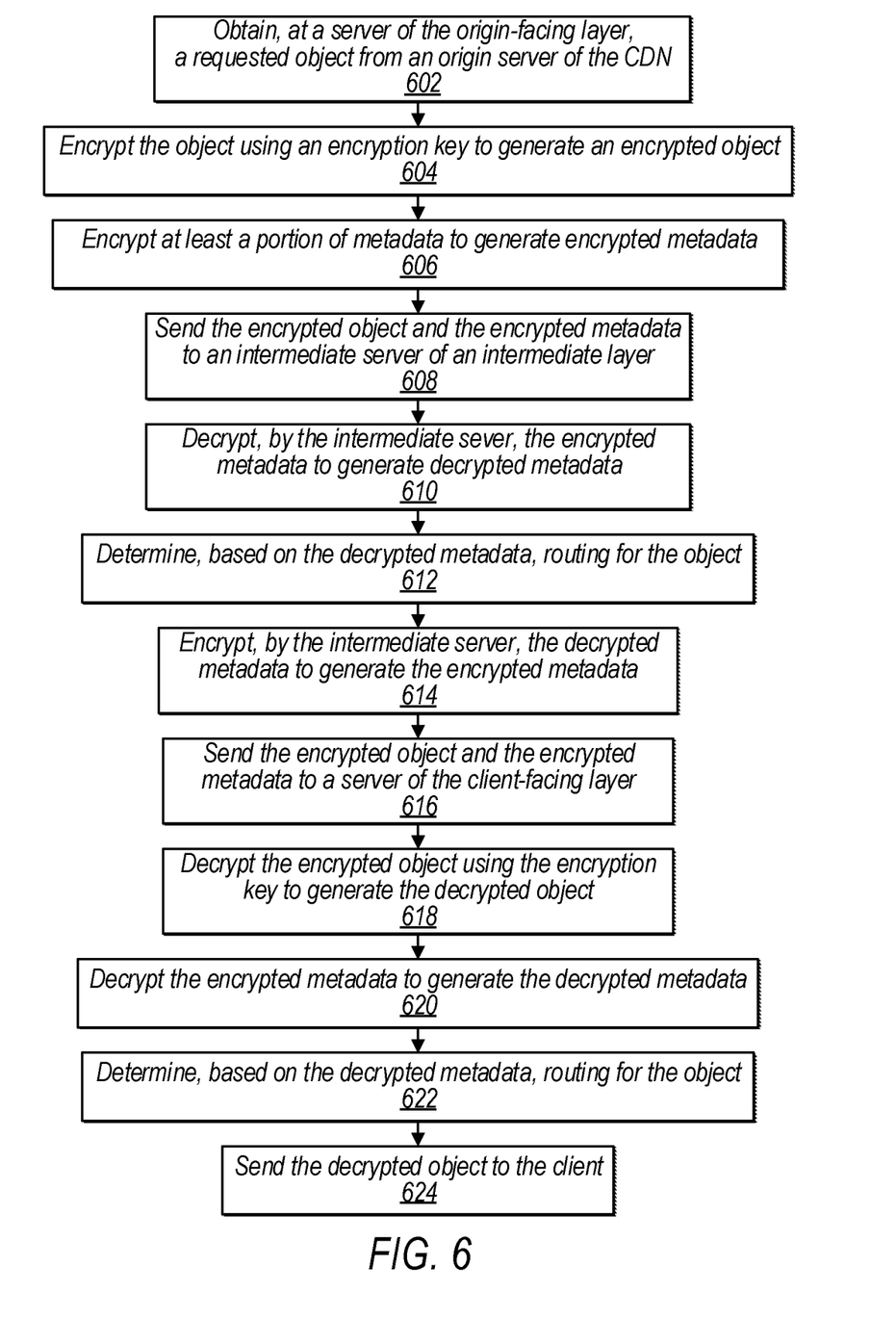
FIG. 6 is a high-level flowchart illustrating various methods and techniques to implement a system for protecting data within an edge location while providing access to associated metadata, according to some embodiments.

FIG. 6 is a high-level flowchart illustrating various methods and techniques to implement a system for protecting data within an edge location while providing access to associated metadata, according to some embodiments. These techniques, as well as the techniques discussed with regard to FIG. 7, may be implemented using components or systems as described above with regard to FIGS. 1-5, as well as other types of components or systems, and thus the following discussion is not intended to be limiting as to the other types of systems that may implement the described techniques.

Note that in some embodiments, the metadata is not encrypted or decrypted. Therefore, some embodiments may perform the techniques described in FIGS. 6 and 7, except without encrypting or decrypting the metadata. As indicated at block 602, an origin-facing server may obtain a requested object from an origin server. In embodiments, the server may determine, based on the metadata (e.g., before encrypting it), routing for the object.

At block 604, the server may encrypt the object using an encryption key to generate an encrypted object. At block 606, the server may encrypt at least a portion of the metadata to generate encrypted metadata. At block 608, the server sends the encrypted object and the encrypted metadata to an intermediate server (e.g., according to the determined routing).

At block 610, the intermediate server separately decrypts the encrypted metadata to generated decrypted metadata. At block 612, the intermediate server determines, based on the decrypted metadata, routing for the object. At block 614, the intermediate server encrypts the decrypted metadata to generate encrypted metadata. At block 616, the intermediate server sends the encrypted object and the encrypted metadata to a server of the client-facing layer (e.g., according to the determined routing).

At block 618, the server of the client-facing layer decrypts the encrypted object using the encryption key to generate the decrypted object. At block 620, the server decrypts the encrypted metadata to generate the decrypted metadata. At block 622, the server determines, based on the decrypted metadata, routing for the object. At block 624, the server sends the decrypted object to the client (e.g., according to the determined routing).

As mentioned above, in some embodiments, the metadata is not encrypted at any of the servers/layers (and remains unencrypted) and therefore may be accessed by any server without any need for decryption. For example, the intermediate layer/server may access the metadata after receiving it from the origin-facing layer (e.g., without decrypting/encrypting it). The intermediate server/layer may also send the metadata to another intermediate layer or the client-facing layer (e.g., without decrypting/encrypting it), where it may be accessed without a need for decryption. Therefore, in embodiments, the metadata may be sent through any number of layers (e.g., anywhere within the edge location) as unencrypted metadata.

Figure 7:
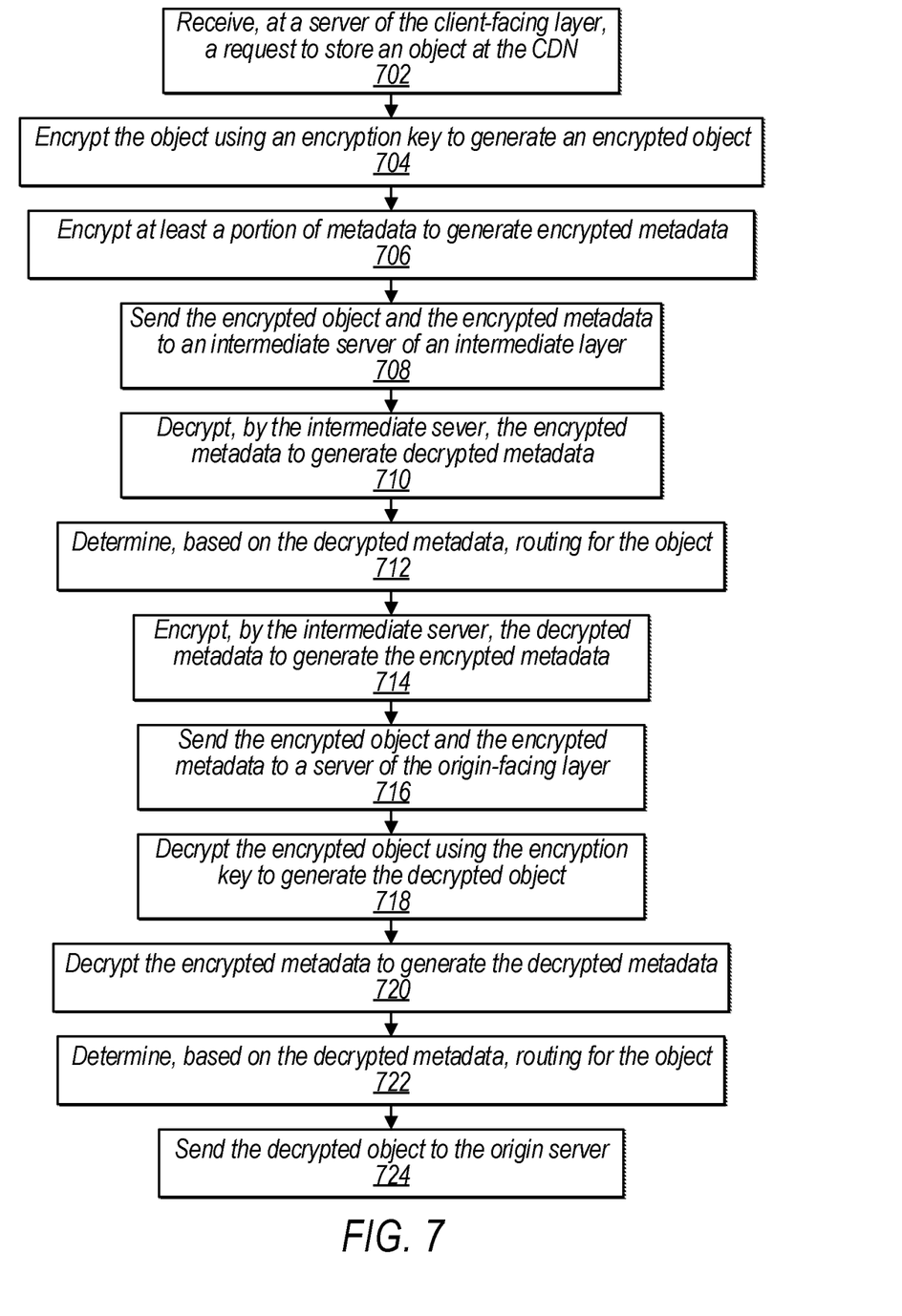
FIG. 7 is a high-level flowchart illustrating various methods and techniques to implement a system for protecting uploaded data within an edge location while providing access to associated metadata, according to some embodiments.

FIG. 7 is a high-level flowchart illustrating various methods and techniques to implement a system for protecting uploaded data within an edge location while providing access to associated metadata, according to some embodiments.

Note that in some embodiments, the metadata is not encrypted or decrypted. Therefore, some embodiments may perform the techniques described in FIGS. 6 and 7, except without encrypting or decrypting the metadata. As indicated at block 702, a client-facing server may receive a requested object from a client. In embodiments, the server may determine, based on the metadata (e.g., before encrypting it), routing for the object.

At block 704, the server may encrypt the object using an encryption key to generate an encrypted object. At block 706, the server may encrypt at least a portion of the metadata to generate encrypted metadata. At block 708, the server sends the encrypted object and the encrypted metadata to an intermediate server (e.g., according to the determined routing).

At block 710, the intermediate server separately decrypts the encrypted metadata to generated decrypted metadata. At block 712, the intermediate server determines, based on the decrypted metadata, routing for the object. At block 714, the intermediate server encrypts the decrypted metadata to generate encrypted metadata. At block 716, the intermediate server sends the encrypted object and the encrypted metadata to a server of the origin-facing layer (e.g., according to the determined routing).

At block 718, the server of the origin-facing layer decrypts the encrypted object using the encryption key to generate the decrypted object. At block 720, the server decrypts the encrypted metadata to generate the decrypted metadata. At block 722, the server determines, based on the decrypted metadata, routing for the object. At block 724, the server sends the decrypted object to the origin server or another destination of the CDN for storage (e.g., according to the determined routing).

As mentioned above, in some embodiments, the metadata is not encrypted at any of the servers/layers (and remains unencrypted) and therefore may be accessed by any server without any need for decryption. For example, the intermediate server/layer may access the metadata after receiving it from the client-facing layer (e.g., without encrypting/decrypting it). The intermediate node may also send the metadata to another intermediate layer or the origin-facing layer for storage at the CDN (e.g., without encrypting/decrypting it), where it may be accessed without a need for decryption. Therefore, in embodiments, the metadata may be sent through any number of layers (e.g., anywhere within the edge location) as unencrypted metadata.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of the servers, encryption manager, and other components that implement the techniques described herein). The various methods as illustrated in the figures and described herein represent example embodiments of methods. The order of any method may be changed, and various elements may be added, reordered, combined, omitted, modified, etc.

Figure 8:
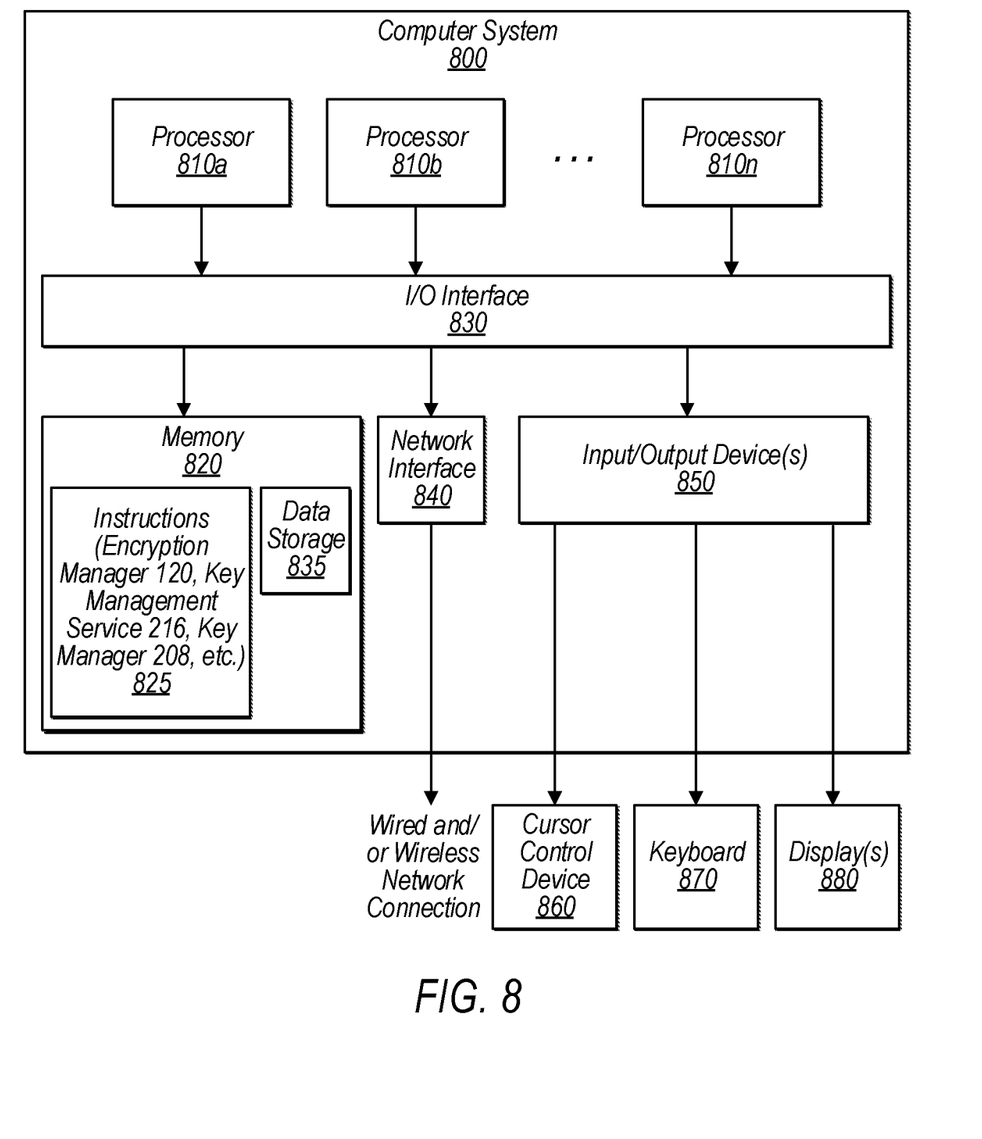
FIG. 8 is a block diagram illustrating an example computing system, according to some embodiments.

Embodiments to implement protecting data within an edge location while providing access to associated metadata as described herein may be executed on one or more computer systems, which may interact with various other systems or devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) may include standard computer monitor(s) and/or other display systems, technologies or devices, in one embodiment. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions, in one embodiment. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 820 may store program instructions 825 and/or data accessible by processor 810, in one embodiment. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., encryption manager, etc.) are shown stored within system memory 820 as program instructions 825 and data storage 835, respectively. In other embodiments, program instructions and/or data may be received, sent or stored upon different types of computer-accessible media or on similar media separate from system memory 820 or computer system 800. A computer-accessible medium may include non-transitory storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 830 may be coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800, in one embodiment. In various embodiments, network interface 840 may support communication via wired or wireless general data networks, such as any suitable type of Ethernet network, for example; via telecommunications/telephony networks such as analog voice networks or digital fiber communications networks;

via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800, in one embodiment. Multiple input/output devices 850 may be present in computer system 800 or may be distributed on various nodes of computer system 800, in one embodiment. In some embodiments, similar input/output devices may be separate from computer system 800 and may interact with one or more nodes of computer system 800 through a wired or wireless connection, such as over network interface 840.

As shown in FIG. 8, memory 820 may include program instructions 825, that implement the various embodiments of the systems as described herein, and data store 835, comprising various data accessible by program instructions 825, in one embodiment. In one embodiment, program instructions 825 may include software elements of embodiments as described herein and as illustrated in the Figures. Data storage 835 may include data that may be used in embodiments (e.g., objects, keys, etc.). In other embodiments, other or different software elements and data may be included.

Those skilled in the art will appreciate that computer system 800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more origin servers of a content delivery network (CDN); and
   one or more edge locations of the CDN, wherein a given edge location comprises:
      one or more servers of an origin-facing layer, wherein a given server of the origin-facing layer is configured to:
         obtain, from one of the origin servers, an object requested by one of a plurality of clients of the CDN, wherein metadata is associated with the object;
         encrypt the object using an encryption key to generate an encrypted object; and
         send the encrypted object and the metadata to an intermediate server of an intermediate layer;
      one or more intermediate servers of the intermediate layer, wherein the one or more intermediate servers comprise the intermediate server, and wherein the intermediate server is configured to:
         obtain the encrypted object and the metadata;
         determine, based on the metadata, routing for the object; and
         send the encrypted object and the metadata to another server of a client-facing layer or to another intermediate layer in accordance with the determined routing; and
      one or more other servers of the client-facing layer, wherein the one or more other servers comprise the other server, and wherein the other server is configured to:
         obtain the encrypted object and the metadata;
         decrypt the encrypted object using the encryption key to generate the decrypted object; and
         send the decrypted object to the client.

2. The system of claim 1, wherein the server of the origin-facing layer and the other server of the client-facing layer are further configured to:

derive the encryption key based at least on:
a master encryption key assigned to the client, and
one or more of an identifier for the client or an identifier for the object.

3. The system of claim 1, wherein to encrypt the object, the server of the origin-facing layer is further configured to:
in response to receipt of the object from the origin server, encrypt the object using an encryption key according to a Galois/Counter Mode (GCM) algorithm or another type of authentication-encryption algorithm and separately encrypt the metadata using a different encryption key, wherein the metadata is encrypted when sent from the server of the origin-facing layer to the intermediate server of the intermediate layer.

4. The system of claim 1, wherein the intermediate server is further configured to:
store at least the encrypted object in a cache; and
in response to receipt, from the other server of the client-facing layer, of a request for the object, send the encrypted object of the cache to the other server of the client-facing layer.

5. The system of claim 1, wherein
the other server of the client-facing layer is further configured to:
receive a request to store another object at the CDN, wherein the request originates from another client, wherein other metadata is associated with the other object;
encrypt the other object using another encryption key to generate another encrypted object; and
send the encrypted other object and the other metadata to the intermediate server;
wherein the intermediate server is configured to:
obtain the encrypted other object and the other metadata;
determine, based on the metadata, routing for the object; and
send the encrypted other object and the other metadata to the server of the origin-facing layer in accordance with the determined routing; and
wherein the server of the origin-facing layer is configured to:
obtain the encrypted other object and the other metadata;
decrypt the encrypted other object using the other encryption key to generate the decrypted other object; and
send the decrypted other object to the origin server or another destination of the CDN.

6. A method, comprising:
performing, by a plurality of computing devices of a content delivery network (CDN):
obtaining, by a server of an edge location of the CDN from an origin server, an object requested by a client of the CDN, wherein metadata is associated with the object;
encrypting, by the server of the edge location, the object;
sending, by the server of the edge location, the encrypted object and the metadata to an intermediate server of the edge location;
determining by the intermediate server of the edge location, based on the metadata, routing for the object;
sending, by the intermediate server of the edge location, at least the encrypted object to another server of the edge location in accordance with the determined routing;
obtaining, by the other server of the edge location, at least the encrypted object;
decrypting, by the other server of the edge location, the encrypted object; and
sending, by the other server of the edge location, the decrypted object to the client.

7. The method of claim 6, wherein the encrypting of the object and the decrypting of the object is performed using an encryption key, and further comprising:
deriving, by one or more of the server or the other server, the encryption key based at least on:
a master encryption key assigned to the client, and
one or more of an identifier for the client or an identifier for the object.

8. The method of claim 6, wherein encrypting, by the server, the object further comprises:
encrypting the object according to a Galois/Counter Mode (GCM) algorithm or another type of authentication-encryption algorithm.

9. The method of claim 6, further comprising:
obtaining, by the other server from the client, a request to store another object, wherein metadata is associated with the other object;
encrypting, by the other server, the other object;
sending, by the other server, the encrypted object and the metadata to an intermediate server;
determining by the intermediate server, based on the metadata, routing for the object;
sending, by the intermediate server, at least the encrypted object to the server in accordance with the determined routing;
decrypting, by the server, the encrypted object; and
sending, by the server, the decrypted object to the origin server or another destination of the CDN.

10. The method of claim 6, further comprising:
obtaining, by the other server, another encrypted object, wherein the other encrypted object was requested by another client of the CDN; and
determining, based at least on an encryption key assigned to the client, that the other encrypted object is not authenticated.

11. The method of claim 6, further comprising:
deriving the encryption key based at least on a master encryption key assigned to the client.

12. The method of claim 6, further comprising:
encrypting, by the server, the metadata associated with the object, wherein the metadata is encrypted separately from the object, and wherein the object and the metadata are encrypted using different encryption keys; and
prior to determining by the intermediate server, based on the metadata, routing for the object, decrypting the metadata by the intermediate server.

13. The method of claim 6, wherein encrypting, by the server, the object comprises:
encrypting, using an encryption key, the object and a portion of the metadata associated with the object, wherein another portion of the metadata is not encrypted by the server.

14. The method of claim 6, wherein sending, by the other server, the decrypted object to the client comprises:
sending the decrypted object to the client using a secure connection in accordance with a transport security layer (TLS) protocol.

15. One or more non-transitory computer-accessible storage media storing program instructions that when executed on or across one or more processors of a server of an edge location of a content delivery network (CDN) cause the one or more processors to:
- obtain, from an intermediate server of an intermediate layer of the edge location, an encrypted object, wherein the encrypted object comprises an encrypted version of an object requested by a client and obtained from an origin server of the CDN, and wherein the encrypted object was encrypted, using an encryption key, by another server of an origin-facing layer of the edge location;
- decrypt the encrypted object using the encryption key to generate the decrypted object; and
- send the decrypted object to the client.

16. The one or more storage media as recited in claim 15, wherein the program instructions when executed on or across the one or more processors cause the one or more processors to:
- derive the encryption key based at least on a master encryption key assigned to the client, wherein the master encryption key is unique with respect to one or more other master encryption keys respectively assigned to one or more other clients of the CDN.

17. The one or more storage media as recited in claim 16, wherein to derive the encryption key, the program instructions when executed on or across the one or more processors further cause the one or more processors to:
- derive the encryption key based on one or more of:
  - an identifier for the client,
  - an identifier for the object, or
  - an identifier associated with a request for the object, wherein the request for the object was submitted by the client to the CDN.

18. The one or more storage media as recited in claim 15, further comprising program instructions that when executed on or across the one or more processors further cause the one or more processors to:
- authenticate the encrypted object according to a Galois/Counter Mode (GCM) algorithm or another type of authentication-encryption algorithm.

19. The one or more storage media as recited in claim 15, further comprising program instructions that when executed on or across the one or more processors further cause the one or more processors to:
- receive, from the client, a request to store another object at the CDN, wherein other metadata is associated with the other object;
- encrypt the other object using another encryption key to generate another encrypted object; and
- send the encrypted other object and the other metadata to the intermediate server.

20. The one or more storage media as recited in claim 19, wherein the program instructions when executed on or across the one or more processors cause the one or more processors to:
- derive the other encryption key based at least on:
  - a master encryption key assigned to the client, and
  - one or more of an identifier for the client, an identifier for the object, or an identifier associated with the request to store the other object at the CDN.

* * * * *